June 2, 1925.   1,540,123
H. E. HARTNEY
ADVERTISING DISPLAY AND NIGHT LANDING SIGNAL FOR AIRCRAFT
Filed Nov. 2, 1923   2 Sheets-Sheet 1
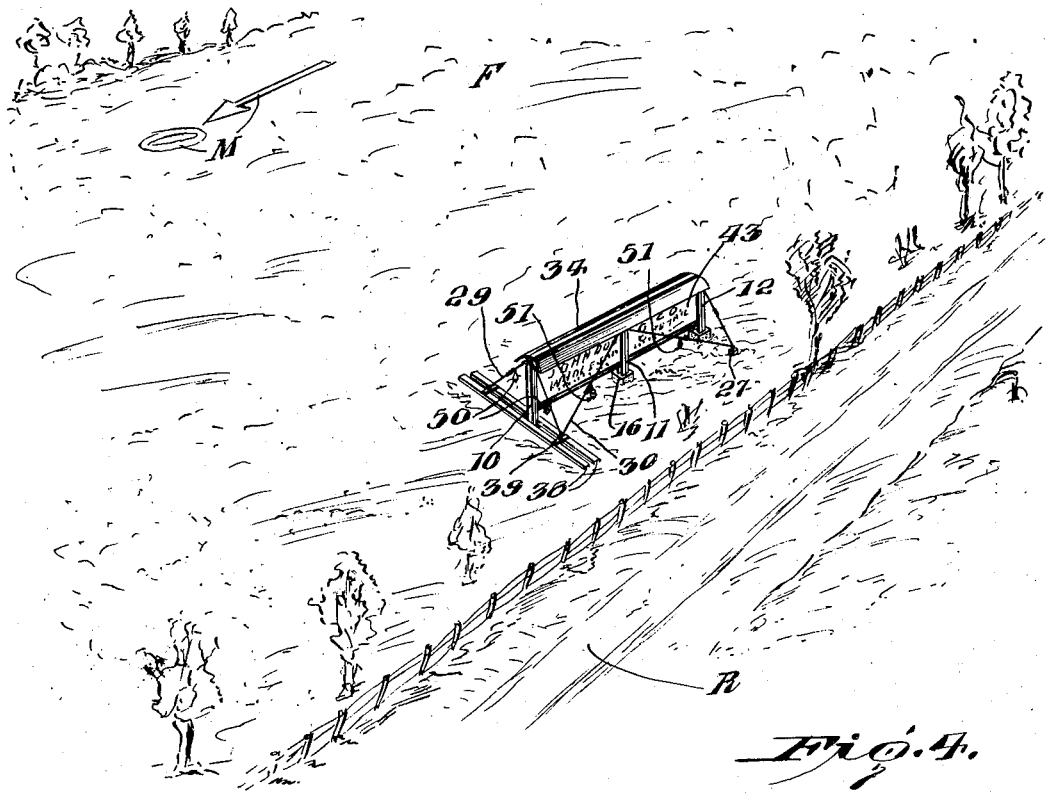
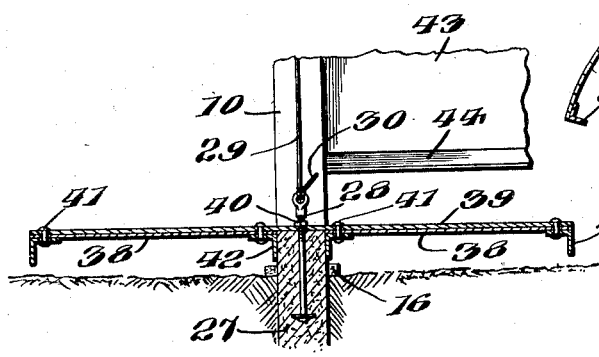
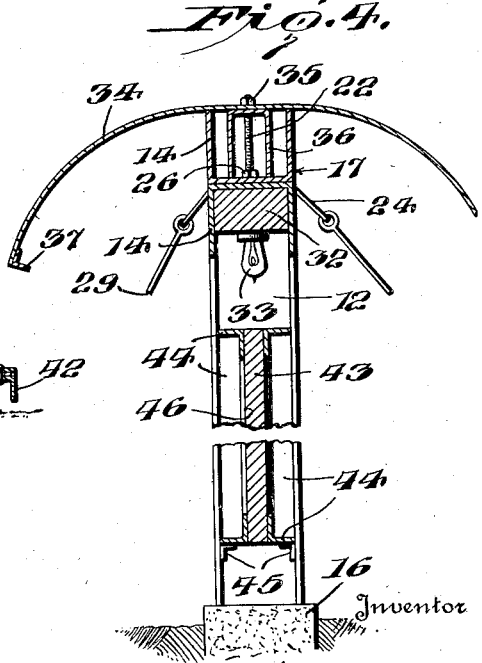
Witness:
Robert F. Beck
Inventor
Harold E. Hartney
By Albert E. Fech
Attorney

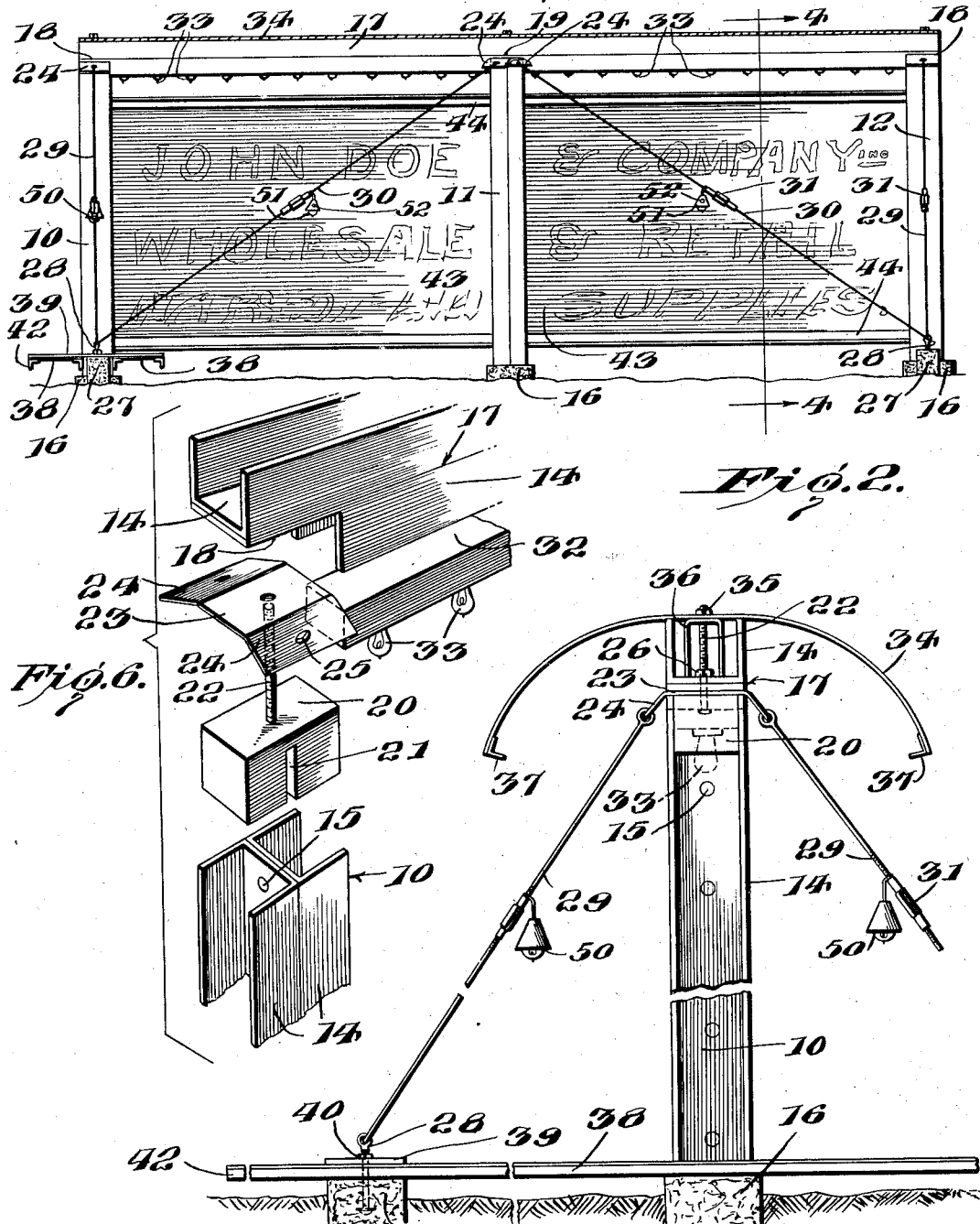

Patented June 2, 1925.

1,540,123

UNITED STATES PATENT OFFICE.

HAROLD E. HARTNEY, OF WASHINGTON, DISTRICT OF COLUMBIA.

ADVERTISING DISPLAY AND NIGHT-LANDING SIGNAL FOR AIRCRAFT.

Application filed November 2, 1923. Serial No. 672,348.

*To all whom it may concern:*

Be it known that I, HAROLD E. HARTNEY, a citizen of the United States of America, and a resident of Washington, District of Columbia, have invented certain new and useful Improvements in Advertising Display and Night-Landing Signals for Aircraft, of which the following is a specification.

This invention relates to certain improvements in advertising display and night landing signals for aircraft; and the nature and objects of the invention will be readily recognized and understood by those skilled in the arts involved in the light of the following explanation and detailed description of the accompanying drawings illustrating what I at present consider to be the preferred embodiments or mechanical expressions of the invention from among various other forms, embodiments, combinations and constructions of which the invention is capable within the spirit and scope thereof.

Established air routes or airways include emergency landing fields at as frequent intervals as possible or praticable along and adjacent the routes between the main landing fields or terminals, so that in the event of accident or other causes necessitating aircraft operating along and over such air routes to land between main landing fields, a safe landing can be made on one of the emergency fields. These emergency landing fields are generally of a rather rough unfinished character sufficient in size and of such a surface that aircraft can effect a safe landing thereon if necessary. Preferably, although of course not always possible, the emergency landing fields are located along and as near as practicable to main roads and highways, so that aircraft forced to land on such an emergency field can more quickly secure assistance and will be readily accessible for removal of cargo and repair. No permanent ground organization and personnel are maintained at emergency landing fields as a general rule, but the fields are visited and inspected at intervals for replacement of supplies and equipment which may be maintained at these fields.

Each emergency landing field is usually provided with more or less permanent markings to indicate to the pilots of aircraft the normal preferred direction for landing on the field, as well as to serve as land marks and field identification to assist in navigation. The type of marking in general use for emergency landing fields is characterized by lines, arrows, circles and such like formed by material suitably placed on the field and painted some color such as white, clearly visible from the air. However, with the advent of night flying the foregoing general type of marking is of no value for emergency or other landing fields, as at night such marking is practically invisible. Various arrangements and systems for lighting landfields have been developed and are in use, but they are practically without exception costly and require the presence of a permanent ground organization at the field for their maintenance and operation, hence such lighting systems are not adapted to use on the emergency type of landing field due to the high cost and requirement for a permanent ground organization.

Therefore, one of the main and fundamental aims of the present invention is to provide for marking and indicating the normal landing direction on, and for efficiently lighting or illuminating landing fields of the emergency and the like types, at a comparatively low cost and without requiring a permanent ground organization or force for maintenance and operation.

A further aim and object of the invention is the provision of means for indicating the normal landing direction on aircraft landing fields and for illuminating a portion of the field along the normal landing run by indirect or diffused light to avoid direct rays with the resulting glare and partial blinding of pilots while landing.

A further object of the invention is to provide a landing field marker and signal for indicating landing direction and for illuminating a landing field at night, which forms and provides a permanent advertising display medium visible from adjacent territory and illuminated at night by the illumination of the landing field from the marker or signal, so as to take advantage of nearby roads and highways by clearly displaying advertising to traffic passing therealong.

A further object of the invention is to provide a night landing signal for aircraft landing fields, which is illuminated and so designed and arranged as to indicate to aircraft in flight the normal direction for landing on a field and which further lights or illuminates a portion of the landing field to permit of aircraft effecting a landing thereon at night.

A further object of the invention is the provision of an advertising display and night landing signal for aircraft landing fields of the so called emergency types particularly, to indicate to aircraft in flight the normal landing direction and to illuminate a portion of the landing run of a field, which signal is of simple construction and relatively low initial cost and inexpensive in use, and capable of reliable efficient operation over extended periods of time without inspection or other attention.

A further object of the invention is the provision of a more or less permanent night landing indicator or signal and field illuminator for aircraft landing fields of the type at which no ground organization or personnel is maintained, which forms and embodies in and of itself an illuminated advertising display medium visible from territory adjacent to a landing field on which installed.

A further object of the invention is to provide an advertising display and night landing signal for landing fields to indicate to aircraft in flight the normal landing direction and to illuminate a portion of the landing run of a field, which is capable of being permanently mounted and installed on a field for operation over extended periods of time without attention, and which is so constructed and installed as to be practically weather proof and able to withstand all the forces and stresses to which subjected in use.

A further object of the invention is to provide an illuminated landing direction and field illuminating signal for aircraft landing fields, which embodies a source of light and a removable wall or panel arranged to form at one side thereof a light reflecting surface from which a portion of a landing field is illuminated, and on the opposite side thereof presenting an illuminated surface for the display of advertising matter to territory adjacent a landing field.

With the foregoing and various other objects in view, which other objects will be readily recognized by those familiar with the operation of landing fields and aircraft from the following description, the invention consists in certain novel features in construction and in combinations and arrangements of elements, as will be more particularly specified and pointed out hereinafter.

Referring to the accompanying drawings:

Fig. 1, is a perspective view of an advertising display and night landing signal embodying the invention installed on an aircraft landing field of the emergency type.

Fig. 2, is a side elevation of the signal disclosed in Fig. 1, showing the advertising display side thereof.

Fig. 3, is an end elevation from the head or forward end of the signal.

Fig. 4, is a vertical, transverse section on the line 4—4, of Fig. 2.

Fig. 5 is a detail section of the forward base or T forming head of the signal.

Fig. 6, is a detail perspective showing the construction and relative arrangement for mounting and securing the upper horizontal beam on the end vertical columns and for attaching and securing the guy or tie rods to the columns.

One possible form and mechanical adaptation of which the invention is capable is disclosed in the accompanying drawings purely by way of an example to illustrate the principles and features of the invention. The illustrated form is particularly adapted to installation on an aircraft landing field of the so-called emergency type, and is shown in the drawings as mounted and installed on a field of such type with a road or highway adjacent the field. However, it is to be apparent, that the invention is not limited to installation on the type and arrangement of field illustrated herewith, such field having been selected because it presents conditions more clearly bringing forth the operation and results of the invention.

In Fig. 1 of the accompanying drawings a landing field F of the rough, emergency type having a shape and surface such that there is one normal preferred landing direction, is shown with a road or highway R running along one side thereof and approximately parallel to the normal landing direction of the field. The field F is without permanent ground organization and is provided with suitable markers M to indicate the normal landing direction on the field. The markers M are of the usual type, such as stones or the like set into the field and painted white so as to be visible from the air. However, such markers are practically invisible at night, and as there is no permanent organization at the field to assist aircraft in landing thereon at night, it will be apparent that such an emergency field so marked is of little or no value for emergency night landings.

According to the present invention a night landing signal or sign is installed on the landing field, which signal indicates to aircraft in flight the normal landing direction for the field and illuminates a portion of the landing run thereof, as well as providing a medium for displaying advertising matter to territory adjacent the field. In the illustrated example of the invention the signal or sign includes a series of spaced vertically disposed columns mounted on and along one side of the field on a line substantially parallel to the normal landing direction. The specific embodiment shown comprises three of such columns 10, 11 and 12, spaced an equal distance apart along the edge of the field F in a line substantially parallel to the normal landing direction of the field, as indicated by the markers M, and adjacent and substantially parallel to the road or highway R, as clearly shown in Fig. 1 of the drawings.

The columns 10, 11 and 12 are identical in construction and each is formed of a pair of channel bars 14 placed back to back and rigidly secured together by any suitable means, such as the rivets 15, to form a rigid element with the side flanges of the channel bars alined and extending outwardly from opposite sides thereof. (See Fig. 6). By the foregoing formation of the columns it is possible to construct the same from stock or standardized materials and thus lower the cost while producing a column of great strength and rigidity. Preferably, the columns 10, 11 and 12 are permanently mounted on the field and in the illustrated example concrete or the like bases 16 are formed in the field and the lower ends of the columns are embedded therein. In mounted installed position the columns 10, 11 and 12 are arranged with the outwardly extending flanges 14 thereof toward or facing each other, that is, with the flanges of the columns in alinement, as will be clear by reference to Figs. 2 and 6 particularly, of the drawings. While the columns are preferably permanently mounted and installed on a field, the invention contemplates and includes the removable mounting of the columns, as by the provision of a removal base or bases for the columns.

The vertical spaced columns 10, 11 and 12 so mounted and installed are connected at and across the upper ends thereof by a horizontally disposed continuous beam 17. The horizontal beam 17 is of similar construction to the vertical columns, being formed of a pair of channel bars 14. The beam 17 is placed in horizontal position extending across the upper ends of and between the vertical columns 10, 11 and 12, with the flanges of the channel bars 14 of which it is formed vertically disposed and extending upwardly and downwardly respectively. (See Fig. 6.) The lower channel bar 14 of beam 17 is cut away at the ends a distance inwardly along the beam to form the opposite end seats 18 which receive the upper ends of the outer vertical columns 10 and 12, respectively, and upon which the beam 17 rests and is supported at the opposite ends thereof. The depending channel bar 14 of beam 17 is likewise cut away intermediate the ends of the beam to form a seat or socket 19 to receive the upper end of the central vertical column 11 upon which the beam rests and is supported intermediate its ends.

The horizontal beam 17 is secured in position fixed on and to the upper ends of the vertical columns by means of bolt blocks and tie plates. A block 20 of the proper size and shape to fit down onto and between the flanges of the channel bars 14 of each vertical column, and having a transverse slot 21 to fit over and receive the vertical web formed by the channel bars 14, is mounted on the upper end of each of the vertical columns 10, 11 and 12. Each block 20 is formed with a vertically disposed externally threaded bolt 22 adapted to extend upwardly through the horizontal beam 17. A tie plate 23 formed with a central bore to receive the bolt 22 of a block 20, is fitted down onto and over each block 20 at the upper ends of the columns 10, 11 and 12, respectively, and each tie plate is provided with the opposite wings 24 extending laterally therefrom. The block 20 at the central or intermediate vertical column 11, is provided in the present instance with a pair of tie plates 23 superposed thereon and disposed in angular relation to each other, so as to provide a pair of the wings 24 on each side of the column inclined forwardly and rearwardly, respectively, as clearly indicated in Fig. 2 of the drawings. The wings 24 of the tie plates 23 are each provided with a bore 25 for attaching a suitable guy member or tie rod, as will be explained hereinafter. The foregoing construction and mounting of the bolt blocks 20 and tie plates 23 on the upper ends of the vertical columns is clearly illustrated in Fig. 6 of the accompanying drawings.

The horizontal beam 17 is mounted in position on and across the upper ends of the vertical columns 10, 11 and 12 and the bolt blocks 20, with the tie plates 23 interposed between the beam and the blocks and the bolts 22 extending upwardly through the beam. Nuts 26, see Figs. 3 and 4, are threaded onto the bolts 22 and firmly bind the beam 17 to the blocks 20 with the tie plates 23 interposed therebetween. The blocks 20 to which the beam 17 is fixed are maintained in position on the columns by means of guy members or tie rods attached to the tie plates 23. In the illustrated example, concrete or the like bases 27 having eye bolts or the like 28 embedded and fixed therein, are placed in the ground at opposite sides of and spaced outwardly from the outer or end vertical columns 10 and 12, respectively. Guy members or tie rods 29 are attached in the bores 25 of the laterally extending wings 24 at opposite sides of each of the columns 10 and 12, and extend downwardly and outwardly to the adjacent eye bolts respectively, in the bases 27 at opposite sides of each of the columns 10 and 12. In a similar manner tie rods 30 are extended forwardly and rearwardly from the pair of tie plate wings 24 at each side of the central column 11, to the forward and rear bases 27 and eye bolts 28, respectively adjacent thereto, as clearly shown in Figs. 1 and 2 of the drawings. Turnbuckles 31 are provided in each of the tie rods 29 and 30, respectively, so that the desired and proper tension can be placed thereon. Thus, the tie rods 29 and 30 between the tie plates 23 and bases 27 at opposite sides of the vertical columns, firmly and securely bind and maintain the blocks 20 to which the horizontal beam 17 is bolted, in position on the ends of the vertical columns 10, 11 and 12, respectively. The arrangement and mounting of the tie rods 29 and 30, is such that the vertical columns 10, 11 and 12 with the upper horizontal beam secured thereon and thereacross, are firmly and rigidly braced and maintained in proper position against the forces to which they are subjected in use.

Similar bars or strips 32 of any suitable material are mounted and secured in any desired manner in the lower channel bar 14 of the horizontal beam 17 between the depending flanges thereof, and these bars 32 extend between the vertical column 10 and intermediate column 11, and the vertical column 12 and intermediate column 11, respectively, as will be clear by reference to the drawings. Any suitable source of light is arranged along the under or lower side of the horizontal beam 17 between the vertical columns 10, 11 and 12, and in the specific example illlustrated this source of light consists of a series of electric lights 33 spaced along the bars 32 between the vertical columns 10, 11 and 12. The electric lights are connected with any suitable source of electric current in the usual or any other desired manner (not shown).

A concave reflector 34 is mounted on and extending along the horizontal beam 17 from vertical column 10, to column 12 and curves downwardly and depends on opposite sides of the vertical columns a sufficient distance to intercept and receive the light rays from the series of electric lights 33. (See Figs. 3 and 4). The reflector 34 is secured in position on the horizontal beam 17 by the bolts 22 which are extended upwardly therethrough and receive the reflector fastening nuts 35 on their outer ends. A U-shaped spacing bar or the like 36 is mounted in the upper channel bar 14 of the horizontal beam 17 and forms a bearing surface through which the bolts 22 extend and upon which the reflector 34 is bolted. The under or concave surface of the reflector 34 is suitably finished or formed to provide a light reflecting medium, and the upper surface thereof is suitably painted or otherwise finished so as to be readily visible to aircraft in flight, as for example by painting the upper surface white. Thus, the reflector 34 forms a protective roofing or covering for the electric lights 33 and likewise forms an elongated marker disposed in the normal landing direction of a field and visible from aircraft in flight. If desired stiffening and bracing angle bars 37 can be secured along the depending free edge portions of the reflector, as indicated in Figs. 3 and 4 of the drawings.

In order to more clearly indicate from the air the normal landing direction of a field, a cross head or transverse marker is mounted at the forward outer vertical column 10, and forms with the upper surface of the reflector 34 what is visible from aircraft in flight as at T, to clearly show the normal or preferred direction, for landing on the field. In the particular embodiment herewith, the transverse member forming the head of the T, comprises the relatively wide cross bars 38 having substantially flat upper surfaces, mounted at the base or lower end of the vertical column 10 and disposed transversely of and with respect to the horizontal beam 17 and reflector 34. The cross bars 38 are mounted in front and to the rear of the vertical column 10, and are secured in position by means of the strips 39 extending transversely thereacross and therebetween at the concrete bases 27 in which the tie rod eye bolts 28 are embedded. The cross strips 39 are secured in position on the concrete bases by the eye bolts 28 which pass therethrough and the fastening nuts 40 threaded onto these eye bolts. The cross bars 38 are fastened to the cross strips 39 in any suitable manner, as by the rivets 41, and the cross bars can be formed of channel or the like elements, or can be flat sheet material suitably stiffened by means of edge angle rods 42 secured on the under sides thereof, as illustrated in the accompanying drawings. The upper surface of the T head formed by the cross bars 38 is finished to be clearly visible from the air, as by painting the cross bars white.

The space between the vertical columns 10, 11 and 12, and the upper horizontal beam 17, is provided with removable walls or panels 43, which on one side form reflecting surfaces for directing light onto the field to illuminate the same, and on the other side presenting an illuminated surface for the display of advertising matter. A panel 43 is mounted between vertical column 10 and intermediate column 11, and a similar panel 43 is mounted between rear, outer vertical column 12 and the intermediate column 11, so that in mounted position these panels form in effect a continuous wall extending between the outer columns 10 and 12, as clearly shown by Figs. 1 and 2 of the drawings. Each panel 43 is secured in a frame formed by the angle bars 44 attached on opposite sides thereabout adjacent the edges of the panel, and this frame so formed is adapted to fit into and be received by the inwardly extended flanges of the channel bars 14 of adjacent vertical columns. Suitable shoulders or seats 45 are provided in the vertical columns upon which the panel frames are supported in position with the lower edges of the panels supported a distance above the ground, as shown particularly in Fig. 4 of the drawings. The panels 43 are of such a height that in mounted position between the vertical columns 10, 11 and 12, the upper edges terminate in a plane below and spaced from the horizontal beam and the sources of light 33. Thus, it will be clear that the panels 43 are removably mounted in and extending between the vertical columns 10, 11 and 12, and by removing the detachably mounted horizontal beam 17 with the reflector 34 thereon, the panels can be lifted from position for replacement.

If desired or found expedient, additional or supplementary reflectors, flood or the like lights 50 are mounted on and suspended from the opposite forward guy members or tie rods 29, respectively, above the cross head or transverse marker formed by the cross bars 38, so as to more clearly illuminate the same at night. Similarly, to afford increased illumination at opposite sides of the signal, reflector, flood or other suitable lighting means 51 are mounted on and suspended from the forwardly and rearwardly extending tie rods 30, respectively, on opposite sides of the signal, and those lights 51 on the side adjacent the road R or away from the landing run of the field, are formed with colored lenses, such as red, on the upper sides thereof visible from the air to indicate to pilots the obstructed side of the signal on which it is not possible to land. Such an arrangement of lenses 52 is purely diagrammatically disclosed in Fig. 2 of the drawings by way of an example.

A night landing signal and advertising display constructed and arranged as described is mounted along one side of a landing field, as the field F, with the panels 43 and reflector 34 disposed substantially parallel to the normal landing direction as indicated in the drawings by the markers M. If there is a road or highway at one side of the field substantially or approximately parallel to the general direction of landing on the field, then the signal and display of the invention is mounted on the side of the field adjacent such road, as shown by the road R in Fig. 1. With the signal so mounted in the daytime from the air the upper surface of the reflector 34 and the transverse cross bars 38 form a T clearly indicating the preferred or normal landing direction for the field.

At night the electric lights 33 are illuminated and the reflector 34 substantially shields the lights 33 and reflects the light rays therefrom onto the opposite side surfaces of the panels 43. The side of the panels 43 facing the landing field F are suitably treated or finished to form a light reflecting and diffusing surface 46 (see Fig. 4) upon which light is directed from the reflector 34 and thence thrown or diffused over the surface of the landing field to illuminate the portion of the landing run opposite the signal and permit of aircraft effecting a landing thereon. By the arrangement of the reflector 34 and vertically disposed reflecting surface 46 in the relations substantially as shown, it is possible to illuminate by means of diffused light without direct rays or glare, a sufficient portion of the field for night landing. The direction for landing is clearly indicated to aircraft in flight by the T formed by the signal, the cross arm or head of which formed by cross bars 38 is illuminated from the lights 33, while the longitudinal or body portion of the T formed by reflector 34, is likewise set out by the lights and visible from the air.

The opposite surface or side of the panels 43 from the reflecting surface 46 on the field side thereof, is illuminated from the lights 33 by the reflector 34, and is formed to receive and display advertising matter to adjacent territory. In the field illustrated the signal of the invention is arranged so that the advertising matter on the panels is clearly displayed to traffic on the adjacent road or highway R. In this manner, advertising space on the signal can be sold and the revenue derived applied to the cost of maintaining and operating the field.

The advertising display and night landing signal is so designed and constructed as to be of low cost to manufacture, and after being mounted and installed on a field requires no permanent organization for its maintenance or operation, as the source of light for illuminating the signal can be controlled by any of a number of well known devices to be automatically cut off during daylight and turned on at nightfall. The sign is further so constructed and braced when installed as to withstand the weather and all forces and stresses to which they are subjected in use.

Attention is here directed to the fact that while electric lights are shown and described herewith as the source of illumination, it is not intended to limit the invention to such type of illumination. In many instances at landing fields of the emergency types, electric current is not available in which event the signal can be illuminated with gas and the lights controlled by automatic devices such as the well known "sun valve" type.

If desired a series or plurality of the signals of the invention can be arranged along the side of or around a field, and although the invention is particularly adapted for installation on the emergency type of field to overcome the peculiar conditions there encountered, it can be also installed on main landing fields or terminals in addition to the field lighting systems thereon, so as to take advantage of the advertising display features of the invention.

The invention is here disclosed as mounted and installed on a landing field but it is equally applicable to installation on floats, pontoons or such like, to illuminate water landings, as will be clear and apparent to those skilled in the aeronautical art.

It is evident that various changes, substitutions, variations and modifications might be resorted to without departing from the spirit and scope of the invention, and hence I do not wish to limit myself to the exact disclosures hereof.

Desiring to protect my invention in the broadest manner legally possible, what I claim is:

1. In a night landing signal for aircraft landing fields, a source of light, a substantially vertically disposed panel having one side thereof formed to provide a light reflecting surface for indirectly projecting light onto a field from said source of light, the opposite side of said panel formed to provide an advertising display medium illuminated from said source of light.

2. In a night landing signal for aircraft landing fields, a substantially vertically disposed reflecting surface facing a field, a source of light disposed approximately within the vertical plane of said surface, and a reflector for directing light from said source onto the reflecting surface for reflection therefrom onto the field.

3. In a night landing signal for aircraft landing fields, a substantially vertically disposed reflecting surface adapted to be mounted facing a landing field, a series of light sources mounted at intervals above said surface, and a concave reflector mounted above said light sources along substantially the length of said vertical surface, the said reflector shielding a field from direct light rays and directing light from said sources onto the reflecting surface for reflection therefrom onto a field.

4. In a night landing signal for aircraft landing fields, a substantially vertically disposed panel having one side thereof forming a reflecting surface adapted to face a landing field, a source of light mounted above said panel, and a substantially concave reflector mounted above said source of light and depending a distance downwardly at opposite sides of said panel to direct light thereonto.

5. In a night landing signal for aircraft landing fields, a substantially vertically disposed panel having one side thereof forming a reflecting surface adapted to face a landing field and the opposite side thereof formed to receive advertising matter, a source of light disposed above said panel, and a substantially concave reflector mounted above said source of light and depending downwardly at opposite sides of said panel, the said reflector directing light onto the reflecting surface of said panel for reflection therefrom onto a field, and directing light onto the opposite side of the panel, to illuminate and display advertising matter thereon.

6. In a night landing signal for aircraft landing fields, a substantially vertically disposed reflecting surface adapted to be mounted facing a landing field, a source of light above said surface, a reflector mounted above said source of light for directing light onto said reflecting surface for reflection therefrom onto a field, and a cross member disposed transversely of said reflecting surface at one end thereof, the said cross member illuminated by said source of light and forming a T with said vertical surface.

7. In a night landing signal for aircraft landing fields, a vertically disposed panel forming a reflecting surface adapted to face a landing field, a source of light above said panel, a reflector mounted above said source of light over and along said panel, the said reflector directing light from said source onto said panel for reflection therefrom onto a field and forming a marker extending substantially parallel to the direction of landing and visible from the air, and a member disposed at one end of said panel to extend from opposite sides thereof and illuminated from said source of light to indicate from the air in cooperation with said reflector the direction for landing on a field.

8. In a night landing signal for aircraft landing fields, a substantially vertically disposed panel having one side thereof formed to provide a reflecting surface adapted to face a landing field and the opposite side thereof formed to receive advertising matter, a source of light, and reflecting means for directing light onto the reflecting surface of said panel for reflection therefrom onto a field and for directing light from said source onto the opposite side of said panel to illuminate advertising matter thereon.

9. In a night landing signal for aircraft landing fields, spaced vertically disposed columns mounted on a landing field, a vertically disposed panel supported on and extending between said columns with one side thereof facing a landing field and formed to provide a reflecting surface, a source of light, and a reflector for directing light onto the reflecting surface of said panel for reflection therefrom onto the field to illuminate the same.

10. In a night landing signal for aircraft landing fields, spaced vertically disposed columns mounted at one side of a field, a vertically disposed panel removably supported on and extending between said columns with one side thereof facing a landing field and forming a light reflecting surface and the opposite side thereof formed to receive advertising matter, a source of light, and means for directing light from said source onto the reflecting surface of the panel for reflection therefrom onto a field, and onto the advertising side of the panel to illuminate advertising matter thereon.

11. In a night landing signal for aircraft landing fields, spaced, vertically disposed columns mounted at one side of a landing field, a horizontally disposed beam secured on and across the upper ends of said columns, a series of lights mounted at and below said horizontal beam, a substantially concave reflector mounted extending along said beam and depending a distance therebelow on opposite sides thereof, and a vertically disposed panel removably supported from and extending between said vertical columns with the upper edge thereof terminating a distance below said horizontal beam and lights, the side of said panel facing a landing field formed to provide a reflecting surface and the opposite side formed to receive advertising matter, and said reflector directing light from the said lights onto the reflecting surface of the panel for reflection therefrom onto a field and onto the opposite side of the panel to illuminate advertising matter thereon.

12. In a night landing signal for aircraft landing fields, a substantially rigid frame mounted at one side of a landing field and comprising spaced vertically disposed columns and a horizontally disposed beam supported on and extending across said columns, a panel removably mounted on and extending between said vertical columns, the side of said panel facing the field forming a reflecting surface and the opposite side thereof formed to receive advertising matter, a source of light and means for directing light from said source onto both sides of said panel.

13. In a landing signal for aircraft, in combination, a substantially vertically disposed reflecting and display panel, a member disposed longitudinally along and over the upper edge of said panel, the said longitudinal member of relatively large width with respect to the thickness of said panel to present a visible upper surface, and a member disposed transversely of said panel at one end thereof below said longitudinal member to form therewith a T visible to aircraft in flight to indicate the landing direction.

Signed at Washington, D. C., this 27th day of October, 1923.

HAROLD E. HARTNEY.